(12) United States Patent
Hsu (10) Patent No.: US 11,867,303 B2
(45) Date of Patent: Jan. 9, 2024

(54) NOZZLE ADAPTER FOR PRESTA VALVE

(71) Applicant: Create Forever Industrial Co., Ltd., Erlin Township, Changhua County (TW)

(72) Inventor: Lung-Kuo Hsu, Erlin Township (TW)

(73) Assignee: Create Forever Industrial Co., Ltd., Erlin Township (TW)

( * ) Notice: Subject to any disclaimer, the term of this patent is extended or adjusted under 35 U.S.C. 154(b) by 191 days.

(21) Appl. No.: 17/489,892

(22) Filed: Sep. 30, 2021

(65) Prior Publication Data
US 2023/0115823 A1 Apr. 13, 2023

(51) Int. Cl.
*F16K 15/20* (2006.01)
*B60C 29/06* (2006.01)
*F16L 37/32* (2006.01)

(52) U.S. Cl.
CPC .......... *F16K 15/207* (2013.01); *B60C 29/064* (2013.01); *F16K 15/205* (2013.01); *F16L 37/32* (2013.01); *Y10T 137/3724* (2015.04); *Y10T 137/3771* (2015.04)

(58) Field of Classification Search
CPC ... F16K 15/207; F16K 15/205; B60C 29/064; F16L 37/32; Y10T 137/3724; Y10T 137/3771
USPC ................................................ 251/142–156
See application file for complete search history.

(56) References Cited

U.S. PATENT DOCUMENTS

| | | | | |
|---|---|---|---|---|
| 792,626 A | * | 6/1905 | Stephens | F16L 19/04 285/259 |
| 793,103 A | * | 6/1905 | Scholtz | F16L 27/073 285/305 |
| 6,904,932 B1 | * | 6/2005 | Haraughty | F16K 15/20 137/231 |
| 7,762,279 B2 | * | 7/2010 | Zeiber | F16L 29/04 251/149.6 |
| 8,297,658 B2 | * | 10/2012 | Le Quere | F16L 37/1215 285/308 |
| 9,249,914 B2 | * | 2/2016 | Kuo | F16L 37/1215 |
| 9,855,928 B2 | * | 1/2018 | Currie | F04B 33/005 |
| 10,166,825 B2 | | 1/2019 | Hsu | |
| 10,247,319 B1 | * | 4/2019 | Wang | F16K 15/20 |
| 2007/0152443 A1 | * | 7/2007 | Cheng | F16L 37/0847 285/317 |
| 2008/0190489 A1 | * | 8/2008 | Wrubel | F16L 37/35 251/149.1 |

(Continued)

*Primary Examiner* — Craig M Schneider
*Assistant Examiner* — Frederick D Soski
(74) *Attorney, Agent, or Firm* — Alan D. Kamrath; Karin L. Williams; Mayer & Williams PC (57) ABSTRACT

A nozzle adapter for an inflation valve contains a connection seat, at least one control element, at least one returning element, a seal cover, and a controlling means. The connection seat includes an imaginary axis line, an inlet, an outlet, an air stop ring, a conduit, an engagement position, a coupling, and a stopping means. A respective control element has a fixing shaft, an engaging portion, and a controlled portion. The at least one returning element is arranged on the at least one control element. The seal cover is fixed outside the coupling, and an airtight space is defined in the coupling. The controlling means mounted on a center of the connection seat opposite to the inlet and in the conduit of the airtight space to move with the controlled portion.

9 Claims, 11 Drawing Sheets

(56) References Cited

U.S. PATENT DOCUMENTS

| | | | |
|---|---|---|---|
| 2010/0290931 A1* | 11/2010 | Sanders | F04B 33/00 417/374 |
| 2014/0210203 A1* | 7/2014 | Lorkowsi | F16L 37/18 285/88 |
| 2014/0261754 A1* | 9/2014 | Wang | F04B 39/10 137/231 |
| 2014/0326345 A1* | 11/2014 | Kuo | F16L 37/28 137/798 |
| 2015/0053280 A1* | 2/2015 | Wang | F16L 37/28 137/231 |
| 2015/0252910 A1* | 9/2015 | Ward | F16K 15/20 137/231 |
| 2015/0330525 A1* | 11/2015 | Wang | B60C 25/18 137/231 |
| 2016/0076662 A1* | 3/2016 | Wang | F16K 15/20 137/231 |
| 2017/0009922 A1* | 1/2017 | Hsu | F16K 35/022 |
| 2017/0152982 A1* | 6/2017 | Chuang | B60S 5/04 |
| 2018/0172167 A1* | 6/2018 | Kuo | F16K 15/20 |
| 2019/0329739 A1* | 10/2019 | Hedrick | B60C 29/066 |
| 2021/0254733 A1* | 8/2021 | Wu | F16K 11/07 |

\* cited by examiner

NOZZLE ADAPTER FOR PRESTA VALVE

BACKGROUND OF THE INVENTION

FIELD OF THE INVENTION

The present invention relates to a nozzle adapter connected with an air inflator valve of a tire of a vehicle to inflate air into the tire, and more particularly to connect with and remove from a Presta valve at a high pressure quickly.

DESCRIPTION OF THE PRIOR ART

To inflate air into a tire of a vehicle, an inflation valve having a check valve is fixed on the tire, and a pressurized pump inflates the air, wherein the pressurized pump has the nozzle adapter to communicate with the inflation valve. When desiring to connect the nozzle adapter with the inflation valve, a fixing device of the nozzle adapter is switched so that the nozzle adapter is connected with the inflation valve, and the fixing device is locked so that the nozzle adapter engages with the inflation valve, thus removing a hand to inflate the air.

The fixing device is used in the following three manners:

A) Rotatable engaging manner, wherein a rubber of the nozzle adapter is pressed to engage the inflation valve tightly, thus avoiding using threads of the inflation valve. But, it is poor to engage the inflation valve by using the rubber, and the rubber is removable easily at high pressure.

B) Rotatable screwing manner, wherein female threads of the nozzle adapter are rotated, and male threads of the inflation valve are rotated to screw with the nozzle adapter at the high pressure. However, rotating the female threads and the male threads are slow and troublesome.

C) Controlling a slidable block by using a fitting sleeve, wherein the slidable block has multiple teeth to engage with the male threads of the inflation valve, the fitting sleeve is pushed forward to control a movement of the multiple teeth of the slidable block, thus engaging the multiple teeth. When removing the multiple teeth from the male threads, the fitting sleeve is pulled backward to control a removal of the multiple teeth of the slidable block from the male threads when inflating the air at the high pressure. Nevertheless, such a controlling manner is operated inconveniently.

Furthermore, the nozzle adapter is operated manually to connect with the inflation valve, and it is required to operate the fixing device, thus having troublesome operation.

To overcome the above-mentioned defects, the inventor invented a joint structure of an air valve disclosed in U.S. Pat. No. 10,166,825 B2, wherein the nozzle adapter is connected with the inflation valve to inflate the air, and the inflation valve is inserted by a conduit of an outlet segment of the nozzle adapter to inflate the air easily. Thereafter, the nozzle adapter is removed after pressing a manual operation portion of a control element to have an easy operation, and multiple teeth engage with threads of the inflation valve securely at the high pressure. However, such a joint structure is merely applicable for Schrader valve instead of Presta valve.

The present invention has arisen to mitigate and/or obviate the afore-described disadvantages.

SUMMARY OF THE INVENTION

The primary object of the present invention is to provide a nozzle adapter for a Presta valve which is operated with one hand easily and conveniently to connect with the Presta valve, such that after inflating air, the nozzle adapter is removed from the Presta valve with one hand, and the Presta valve is inserted into an outlet of the nozzle adapter automatically, wherein the nozzle adapter is removed from the Presta valve by using a controlling means easily and conveniently.

Another object of the present invention is to provide a nozzle adapter for a Presta valve which is applied to inflate the air at a high pressure, wherein when an inflation pressure is excessive, the Presta valve is pushed outward by the air pressure, and two engaging portions of two control elements are pulled to a screwing portion of the Presta valve so that two engaging portions engage with a screwing portion of the Presta valve more forcefully, thus using the Presta valve to inflate the air at the high pressure appropriately.

To obtain above-mentioned aspect, a nozzle adapter for a Presta valve provided by the present invention contains: a connection seat, at least one control element, at least one returning element, a seal cover, and a controlling means.

The connection seat includes an imaginary axis line defined on a center of the connection seat, an inlet defined on a first end of the imaginary axis line, an outlet formed on a second end of the imaginary axis line, an air stop ring received in the outlet, a conduit defined between the inlet and the outlet, an engagement position defined in the conduit, a coupling defined on the connection seat, and a stopping means formed outside the coupling. The coupling has at least one controlling trench defined outside the conduit, the at least one controlling trench extends to the engagement position via the inlet, and a respective controlling trench has a trench portion extending to the outlet adjacent to the air stop ring.

The at least one control element is accommodated in the at least one controlling trench. A respective control element has a fixing shaft extending on a first end thereof and connected with the trench portion, such that the at least one control element swings along the fixing shaft arcuately, the respective control element has an engaging portion extending from a second end thereof and has a controlled portion. The engaging portion is toothed and extends out of the engagement position.

The at least one returning element is arranged on the at least one control element so that the engaging portion is pushed into the engagement position.

The seal cover is fixed outside the coupling of the connection seat, and an airtight space is defined in the coupling by mating with the stopping means.

The controlling means is mounted on a center of the connection seat opposite to the inlet and in the conduit of the airtight space to move with the controlled portion. The controlling means extends out of the connection seat and is switched manually, when the controlling means is switched manually, the controlled portion is moved so that the engaging portion of the respective control element moves outward away from the engagement position.

The nozzle adapter is applicable for the Presta valve, and the Presta valve includes an inlet portion, a screwing portion, and a neck portion. The Presta valve is inserted into the outlet, the neck portion is engaged matingly by the air stop ring of the Presta valve, and the screwing portion is engaged by the engaging portion at the engagement position. The screwing portion moves forward from the outlet to the inlet.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

With reference to FIGS. 1-6, a nozzle adapter for a Presta valve according to a preferred embodiment of the present invention, a nozzle adapter 1 is communicated with the Presta valve 2 to inflate air, the Presta valve 2 comprises an inlet portion 2A, a screwing portion 2B, and a neck portion 2C (as shown in FIGS. 7-11). The nozzle adapter 1 includes a connection seat 10, a cap 10A, a lid 20, at least one control element 30, at least one returning element 40, a seal cover 50, and a controlling means 60.

The connection seat 10 includes an imaginary axis line L1 defined on a center thereof, an inlet 11 defined on a first end of the imaginary axis line L1, and an outlet 12 formed on a second end of the imaginary axis line L1, an air stop ring 13 and a locking ring 13A which are received in the outlet 12. The air stop ring 13 is made of rubber and has a protrusion 131 formed on an inner wall thereof, the locking ring 13A has a first threaded portion 13B formed on an outer wall thereof, the connection seat 10 has a second threaded portion 121 formed on an inner wall of the outlet 12 thereof, such that the first threaded portion 13B of the locking ring 13A is screwed with the second threaded portion 121 of the outlet 12 so that the locking ring 13A is fixed on the air stop ring 13. The connection seat 10 includes two grooves 14 defined on the first end of the imaginary axis line L1, a third threaded portion 15 screwed with the cap 10A, and a fourth threaded portion 10B formed on the cap 10A, wherein the fourth threaded portion 10B of the cap 10A is screwed with the third threaded portion 15, a conduit 16 defined between the inlet 11 and the outlet 12, an engagement position 161 defined in the conduit 16, a coupling 17 defined on the connection seat 10, and a stopping means 18 formed outside the coupling slot 17, wherein the stopping means 18 is two O-shaped rings 181, and the two O-shaped rings 181 are engaged on the cap 10A of the connection seat 10. The coupling 17 has at least one controlling trench 19 defined outside the conduit 16. In this embodiment, two controlling trenches 19 extend to the engagement position 161 via the inlet 11, wherein a respective controlling trench 19 has a trench portion 191 extending to the outlet 12 adjacent to the air stop ring 13.

Figure 1:
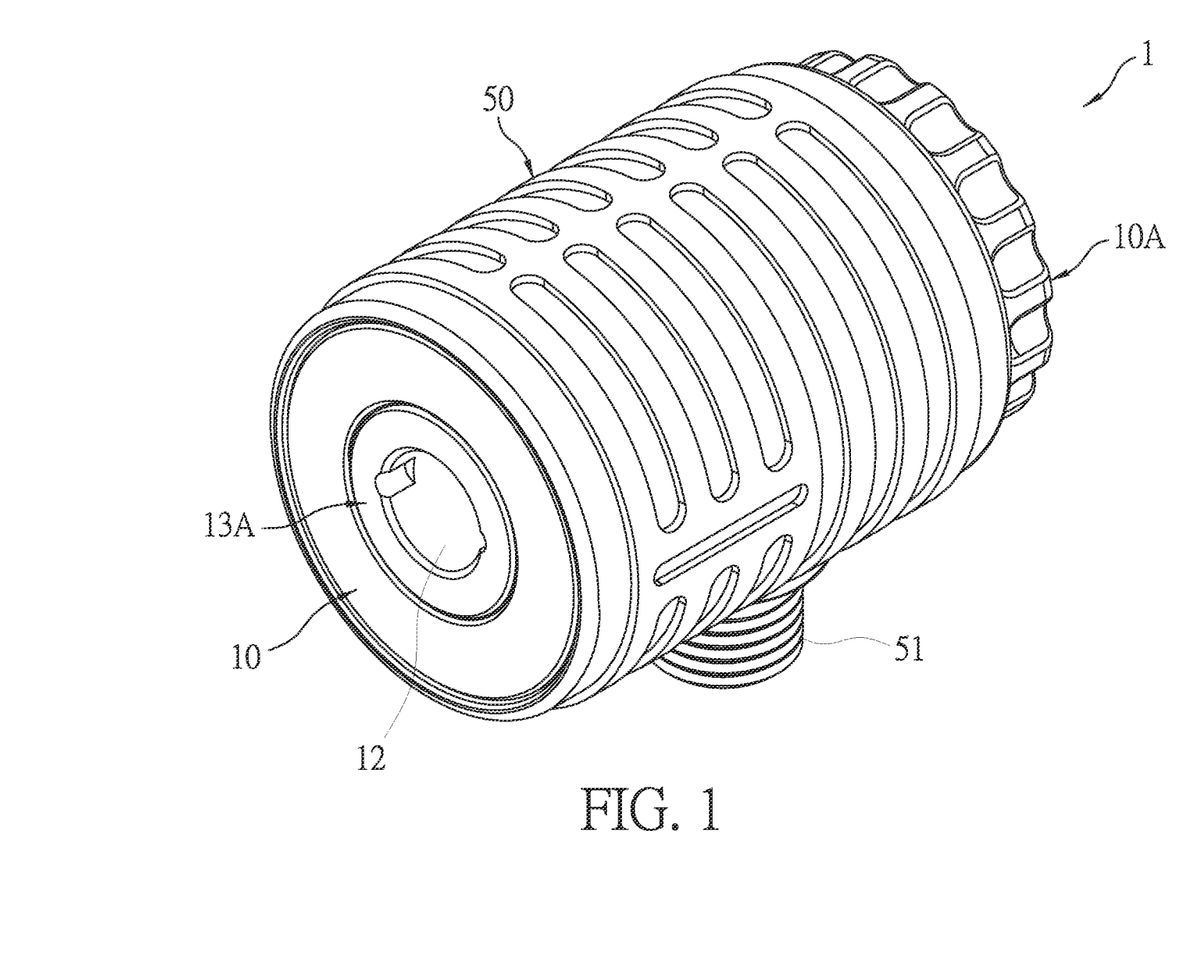
FIG. 1 is a perspective view showing the assembly of a nozzle adapter for a Presta valve according to a preferred embodiment of the present invention.
Figure 2:
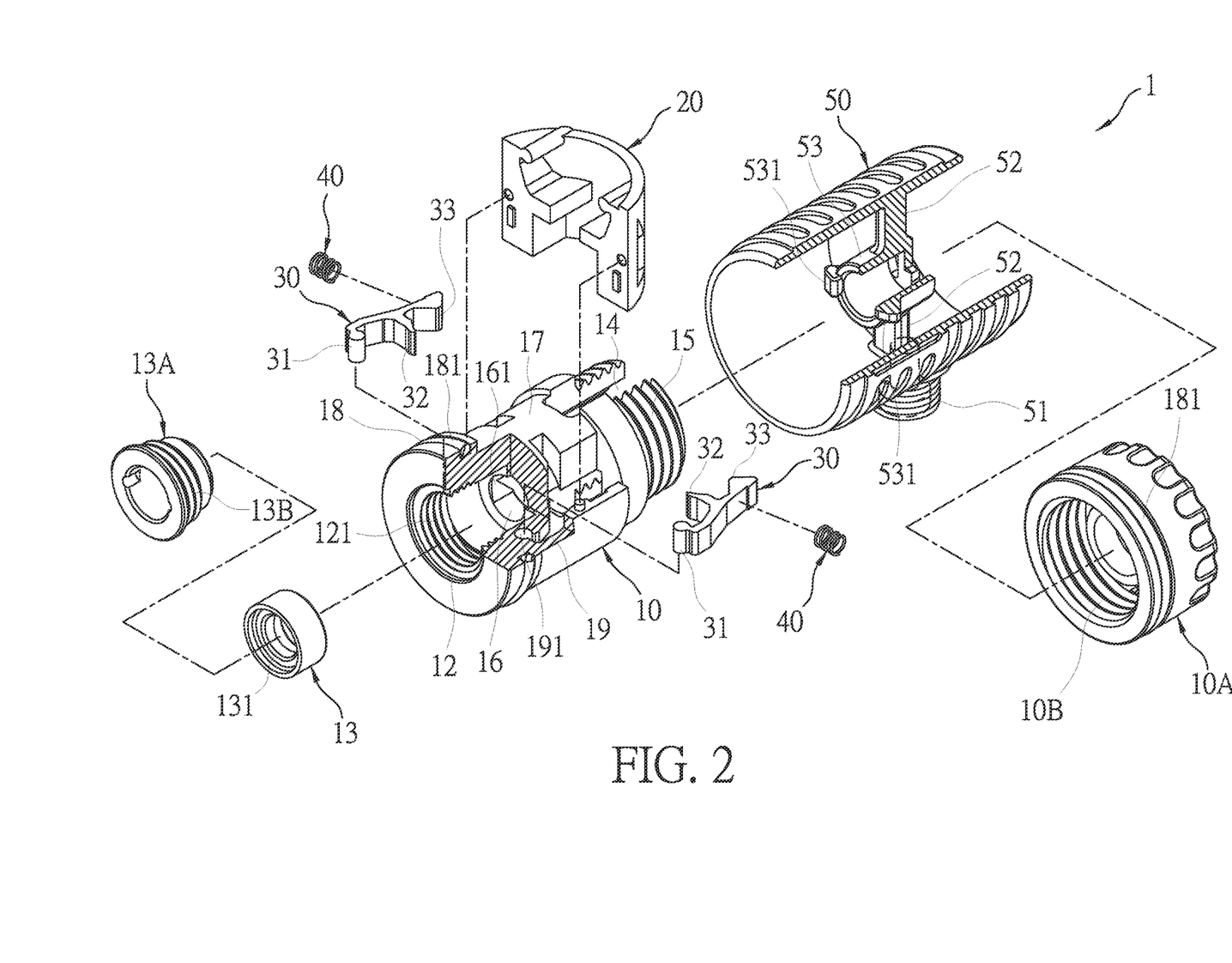
FIG. 2 is a cross-sectional perspective view showing the exploded components of the nozzle adapter for the Presta valve according to the preferred embodiment of the present invention.
Figure 5:
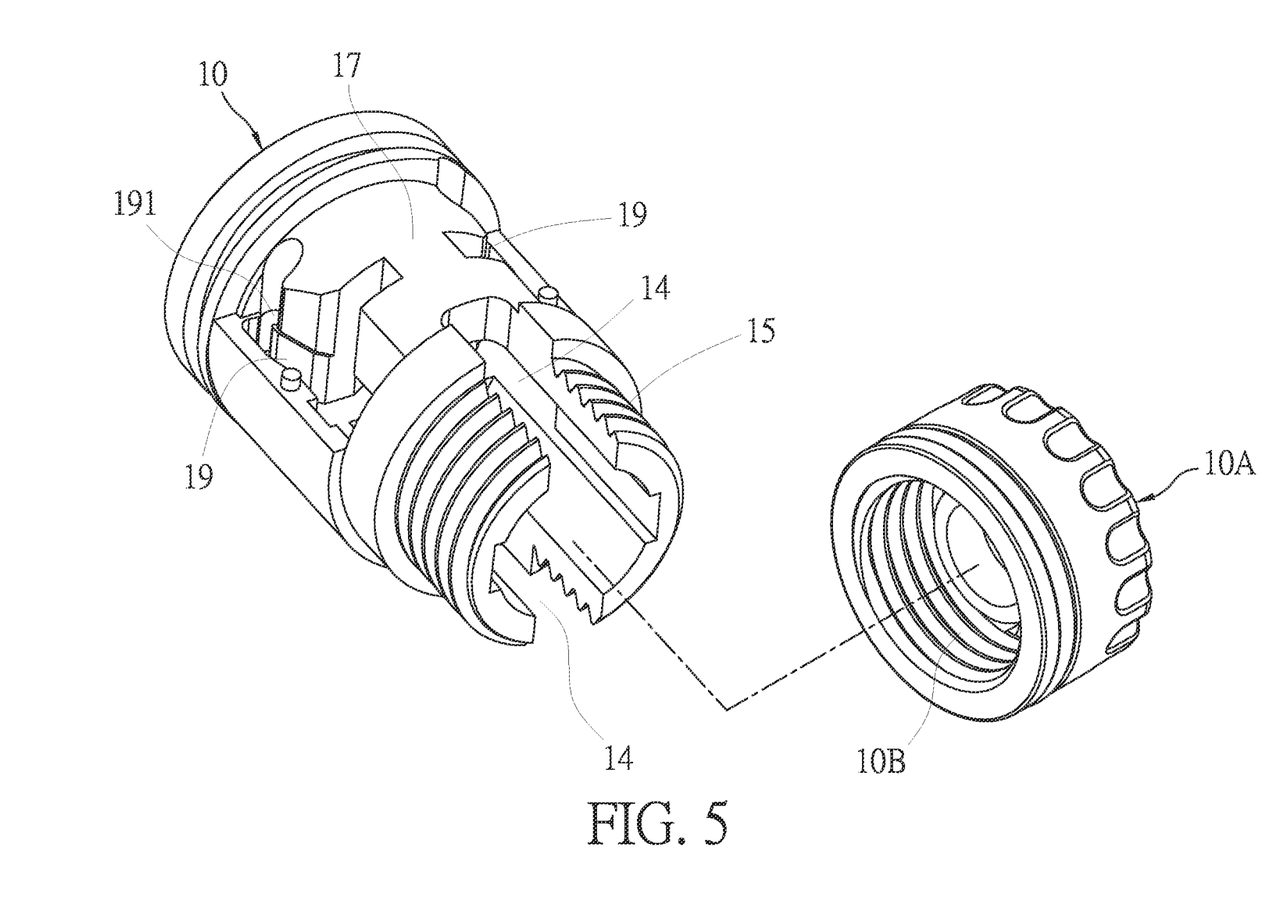
FIG. 5 is a perspective view showing the exploded components of the connection seat and the cap of the nozzle adapter for the Presta valve according to the preferred embodiment of the present invention.

The lid 20 covers the coupling 17 of the connection seat 10 to close the two controlling trenches 19.

In this embodiment, two control elements 30 are accommodated in the two controlling trenches 19, wherein a respective control element 30 has a fixing shaft 31 extending on a first end thereof and connected with the trench portion 191, such that the control element 30 swings along the fixing shaft 31 arcuately. The respective control element 30 has an engaging portion 32 extending from a second end thereof and has a controlled portion 33, wherein the engaging portion 32 is toothed and extends out of the engagement position 161, and the engaging portion 32 has a tilted guide face 321 formed proximate to the outlet 12.

In this embodiment, the two returning elements 40 are two springs arranged on the two control elements 30 so that two tilted guide faces 321 of the two control elements 30 are pushed into the engagement position 161 by the two returning elements 40.

Figure 3:
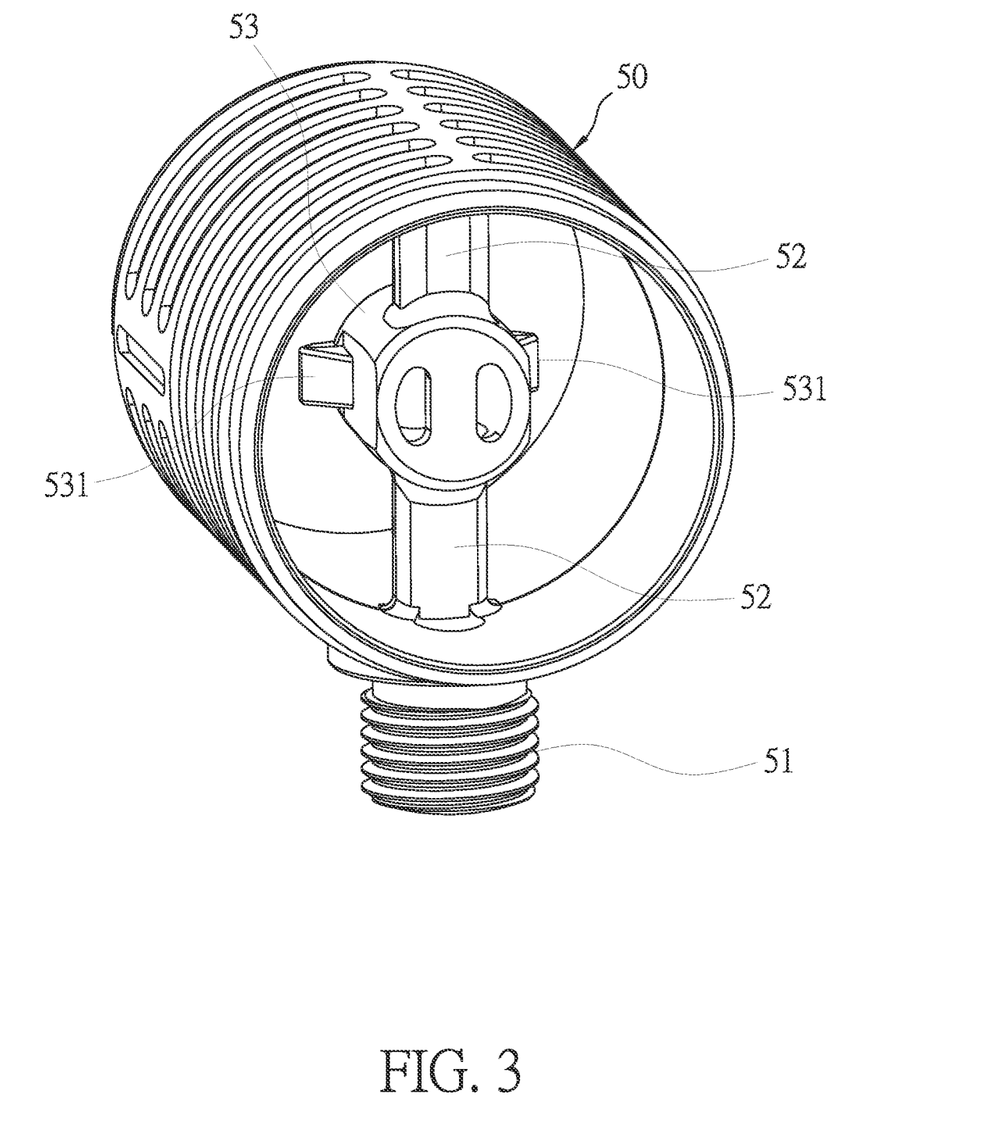
FIG. 3 is a perspective view showing the assembly of a seal cover of the nozzle adapter for the Presta valve according to the preferred embodiment of the present invention.
Figure 4:
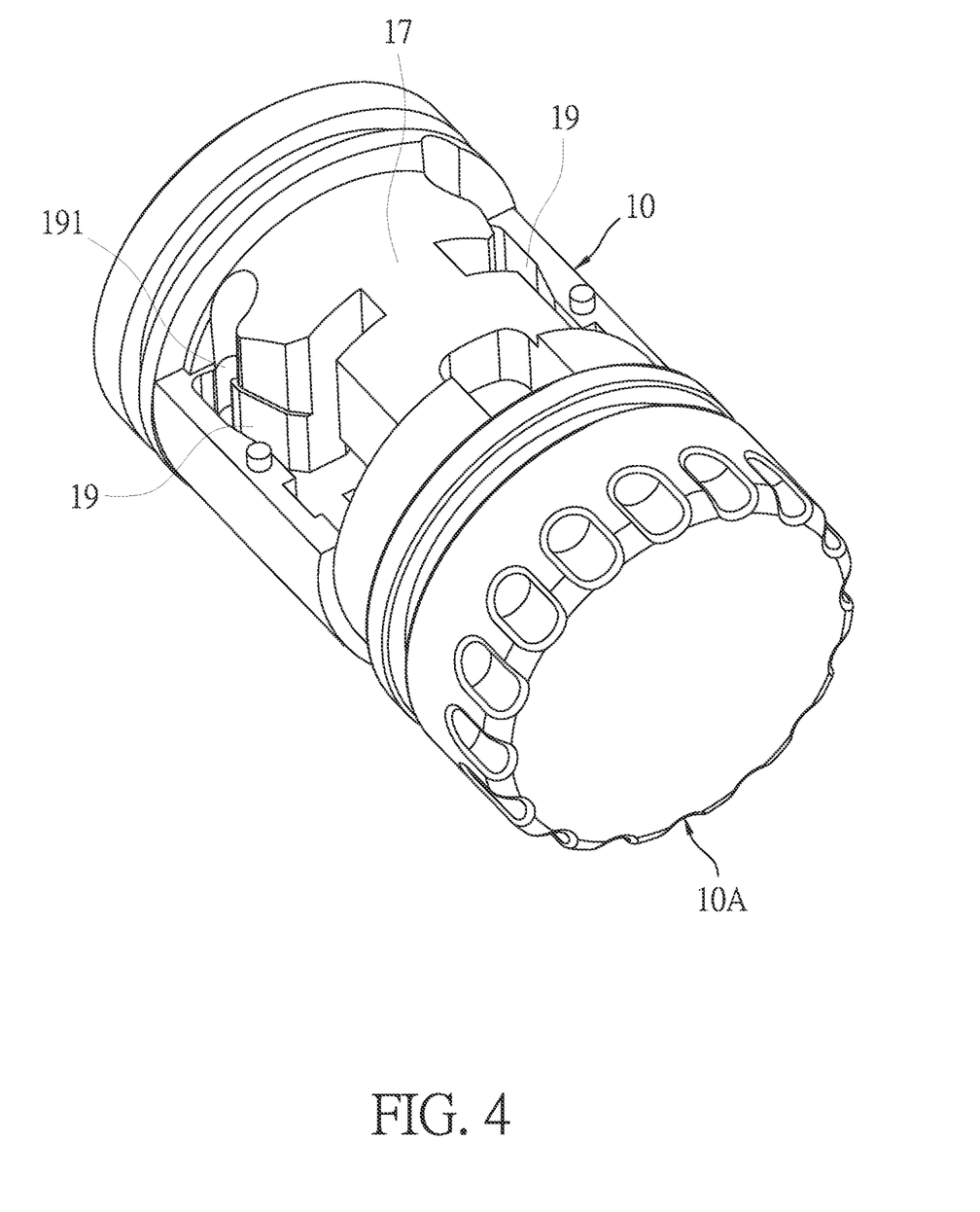
FIG. 4 is a perspective view showing the assembly of a connection seat and a cap of the nozzle adapter for the Presta valve according to the preferred embodiment of the present invention.
Figure 6:
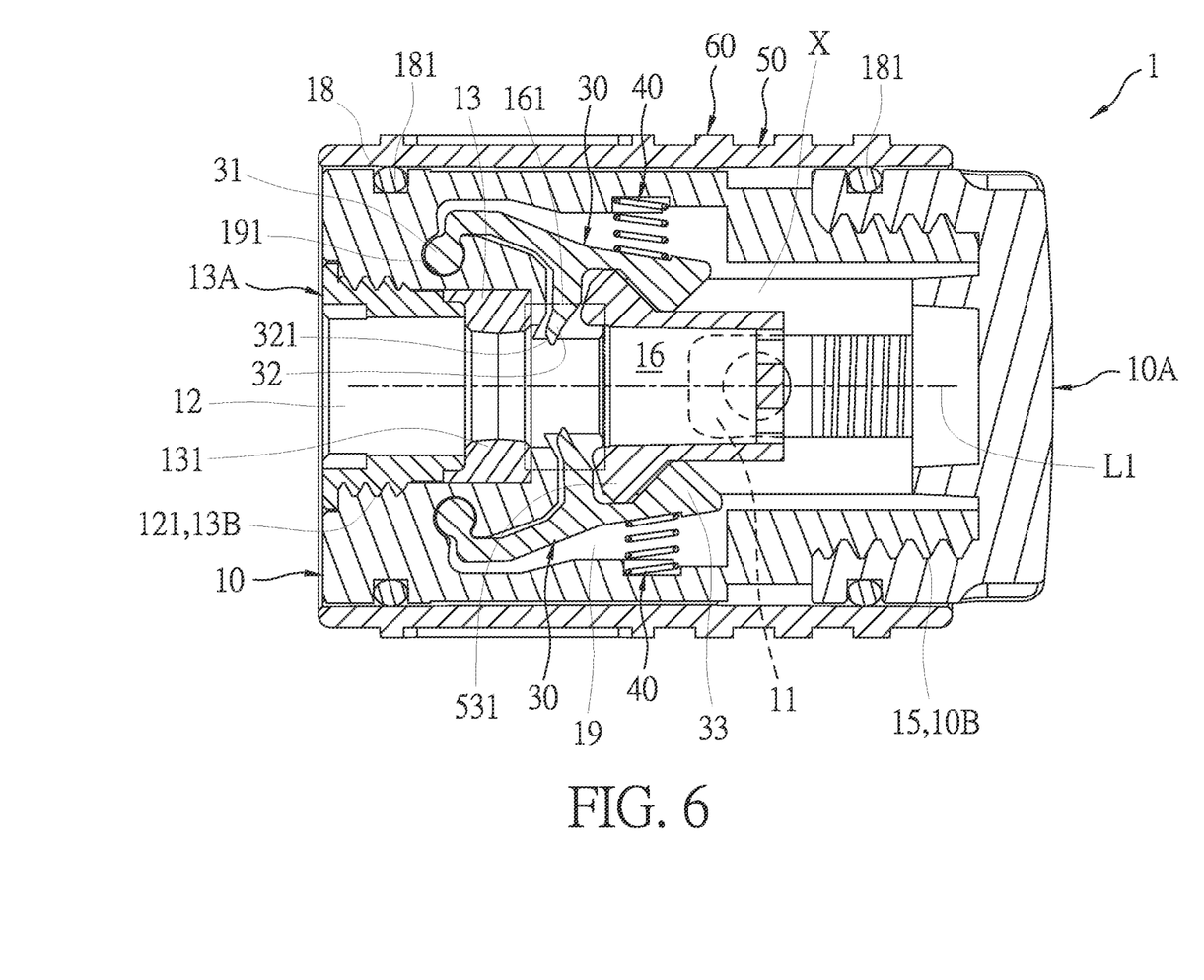
FIG. 6 is a cross sectional view showing the assembly of the nozzle adapter for the Presta valve according to the preferred embodiment of the present invention.

The seal cover 50 is fixed outside the coupling 17 of the connection seat 10, and an airtight space X is defined in the coupling 17 by mating with the stopping means 18. The seal cover 50 is fitted on an outer wall of the connection seat 10 and mates with the two O-shaped rings 181. Furthermore, the seal cover 50 includes an inlet tube 51 received in the airtight space X and communicates with the inlet 11 and the conduit 16, wherein the seal cover 50 further includes two slidable posts 52 mounted on an inner wall thereof, and a cylindrical actuation portion 53 is defined between the two slidable posts 52. The cylindrical actuation portion 53 has two confining sections 531 configured to drive the two controlled portions 33 of the two control elements to move, and the slidable posts 52 are slidably received and slide in the two grooves 14 of the connection seat 10 and are limited by the cap 10A.

The controlling means 60 is mounted on a center of the connection seat 10 opposite to the inlet 11 and in the conduit 16 of the airtight space X to move with the controlled portion 33, wherein the controlling means 60 extends out of the connection seat 10 and is switched manually. When the controlling means 60 is switched manually, the controlled portion 33 is moved. In this embodiment, the controlling means 60 is to slide the seal cover 50 on the connection seat 10. When the seal cover 50 moves away from the outlet 12, the two confining sections 531 of the seal cover 50 push the two controlled portions 33 of the two control elements 30 outward so that two engaging portions 32 of the two control elements 30 move outward away from the engagement position 161, and the two returning elements 40 are pressed.

Figure 7:
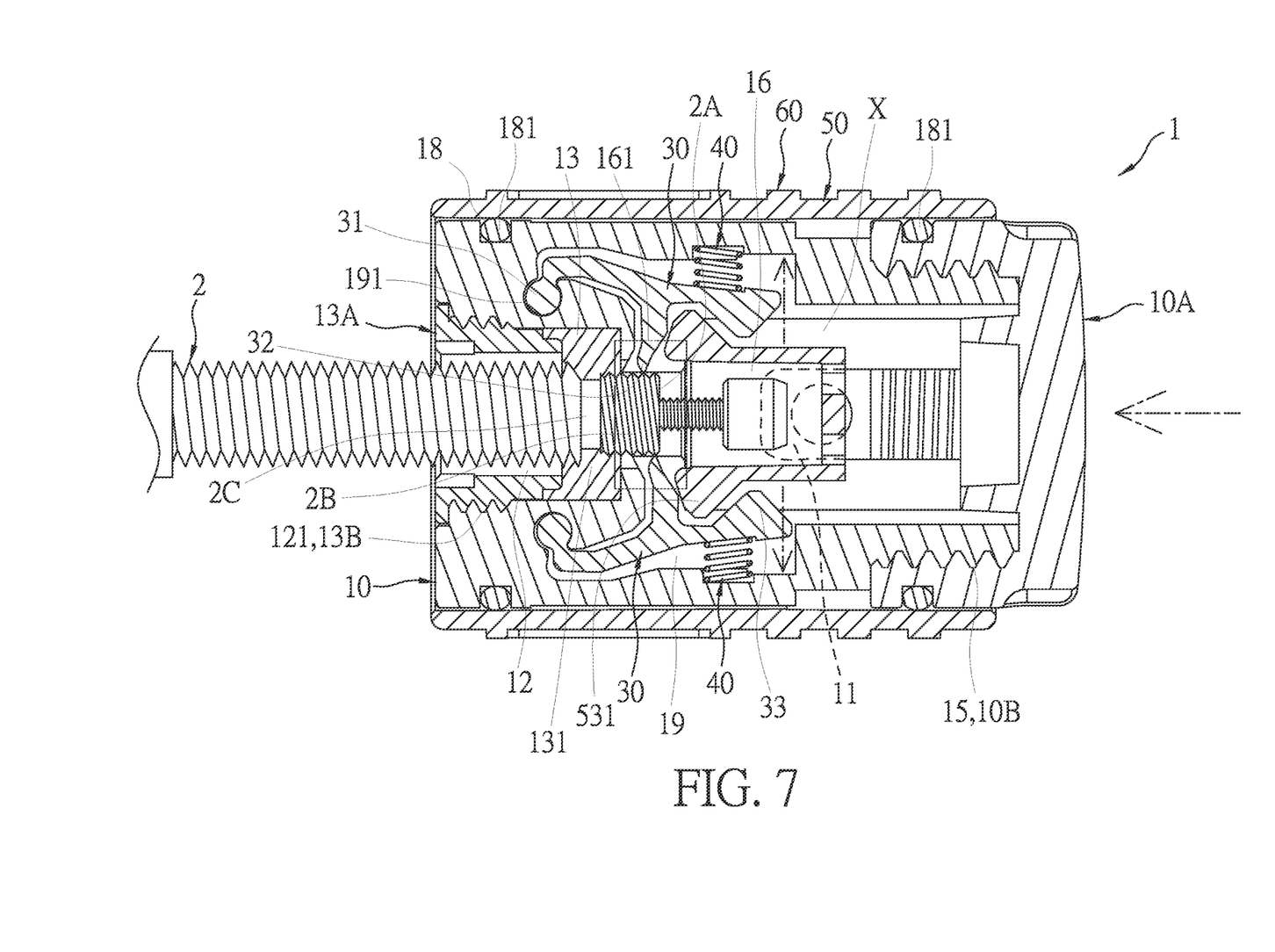
FIG. 7 is a cross sectional view showing the operation of the nozzle adapter for the Presta valve according to the preferred embodiment of the present invention.
Figure 8:
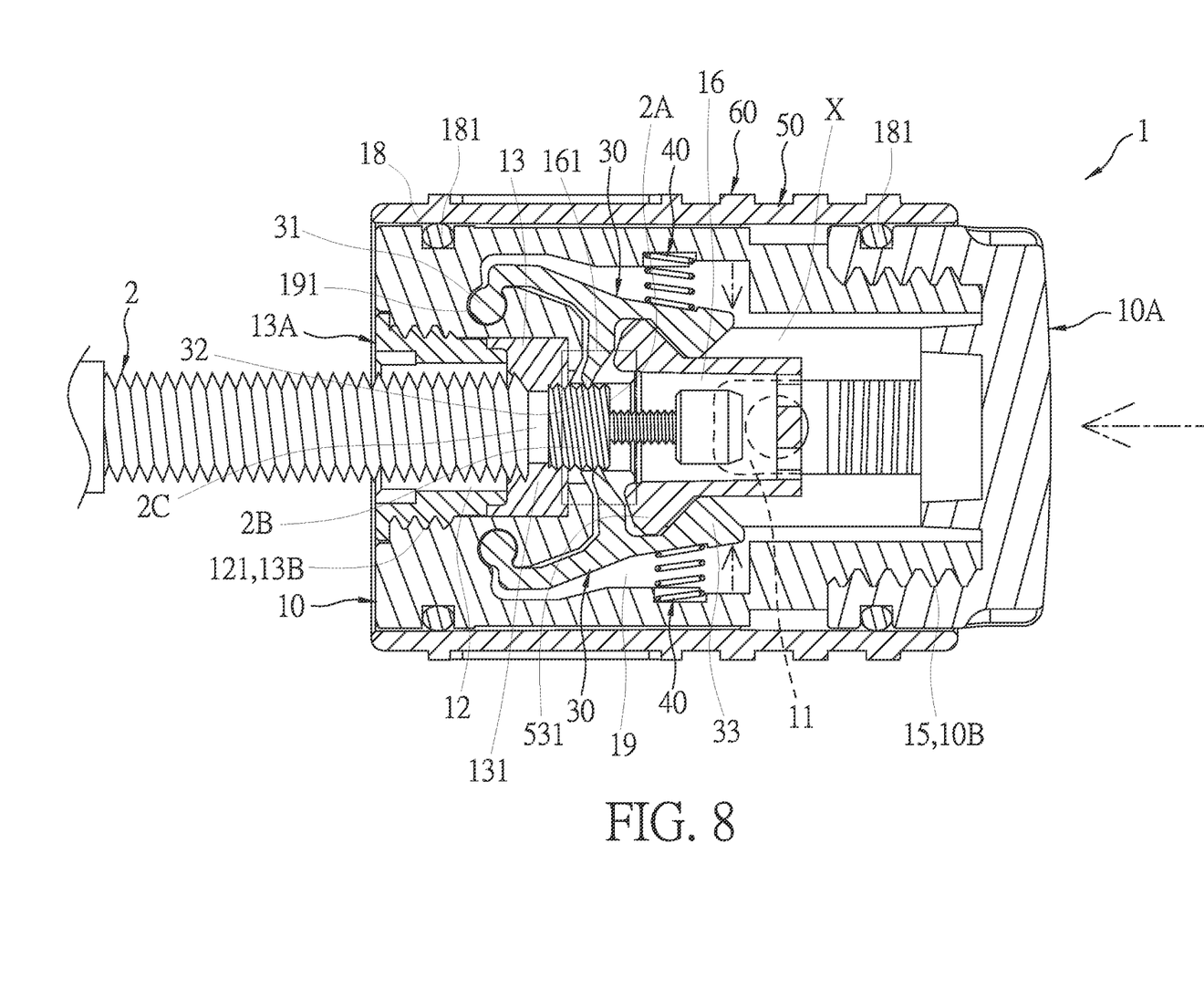
FIG. 8 is another cross sectional view showing the operation of the nozzle adapter for the Presta valve according to the preferred embodiment of the present invention.
Figure 9:
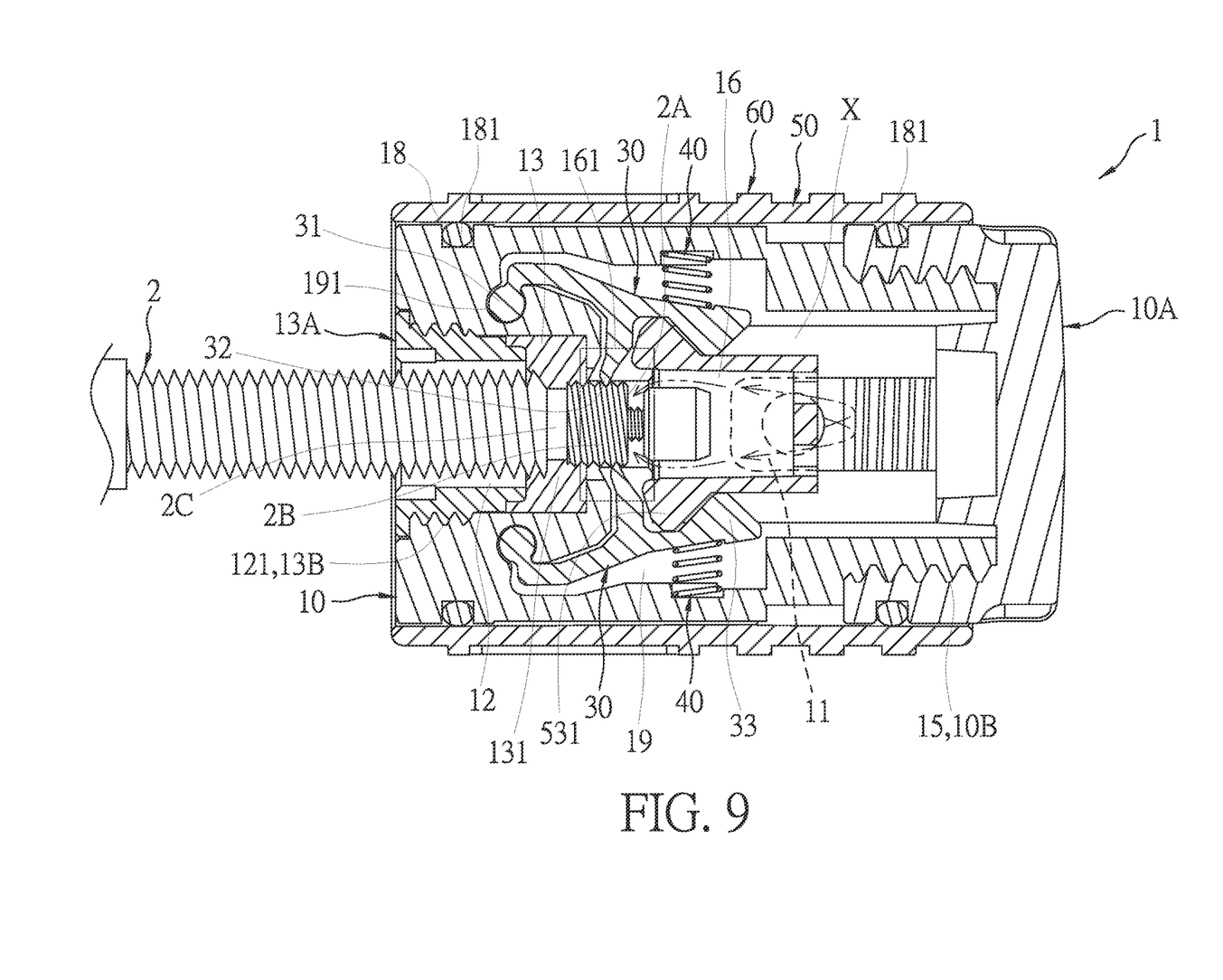
FIG. 9 is also another cross sectional view showing the operation of the nozzle adapter for the Presta valve according to the preferred embodiment of the present invention.

When inflating the air via the Presta valve 2 by using the nozzle adapter 1, as shown in FIGS. 7 and 8, the Presta valve 2 is manually inserted into the outlet 12 with one hand only, and the two engaging portions 32 of the two control elements 30 are pushed by the screwing portion 2B of the Presta valve 2 and the two returning elements 40 to open flexibly, and when the Presta valve 2 is inserted into the predetermined position, the neck portion 2C of the Presta valve 2 is engaged matingly by the air stop ring 13 to produce an airtight state, and the screwing portion 2B of the Presta valve 2 is engaged by the two engaging portions 32 of the two control elements 30 at the engagement position 161. When the nozzle adapter 1 supplies the air, as illustrated in FIG. 9, the air flow into the inlet portion 2A of the Presta valve 2 from the inlet tube 51 of the seal cover 50 via the inlet 11 and the conduit 16 of the connection seat 10 to expand an air valve (not shown) in the Presta valve 2 by way of an air pressure, thus inflating the air.

Figure 10:
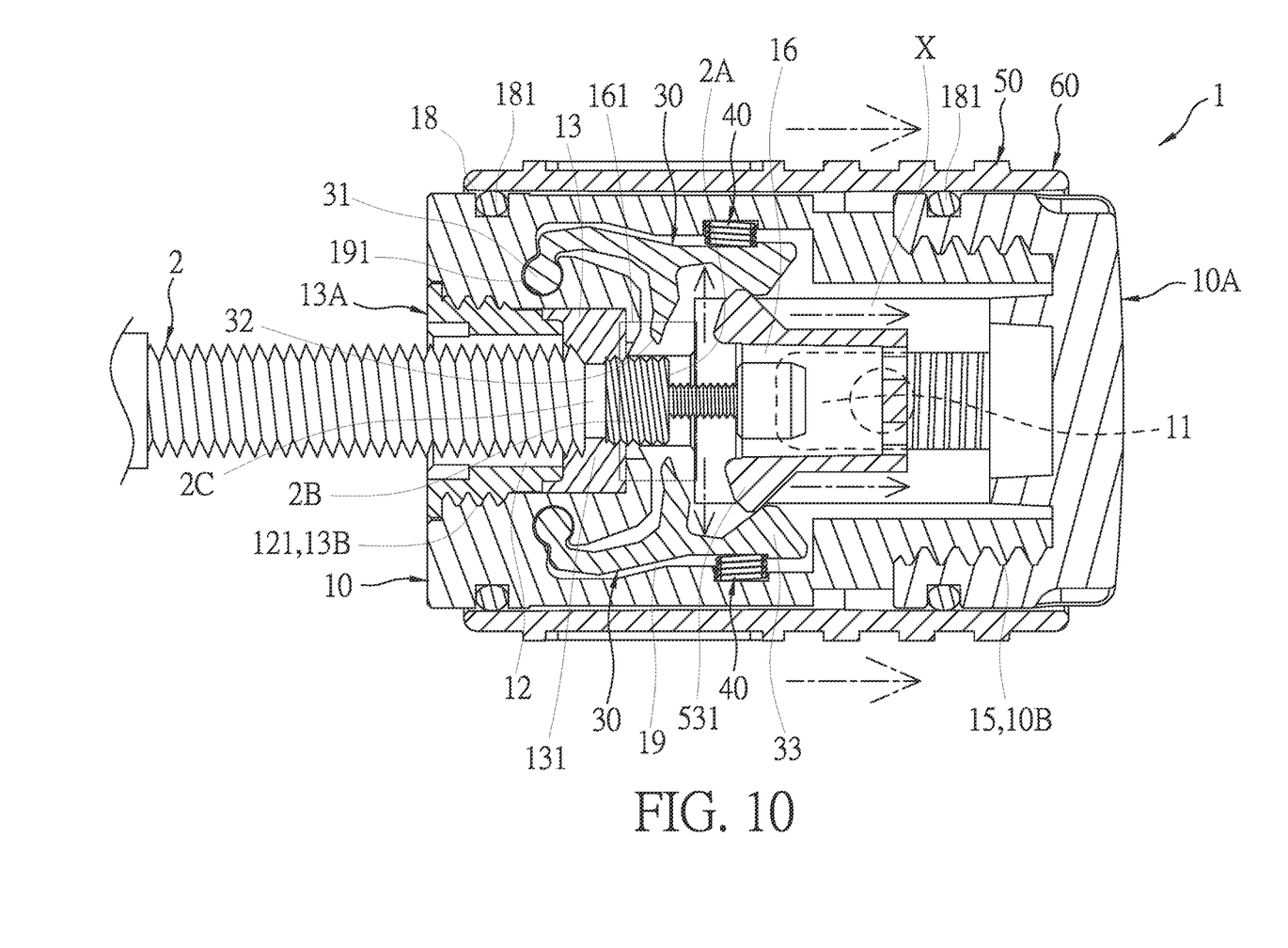
FIG. 10 is still another cross sectional view showing the operation of the nozzle adapter for the Presta valve according to the preferred embodiment of the present invention.
Figure 11:
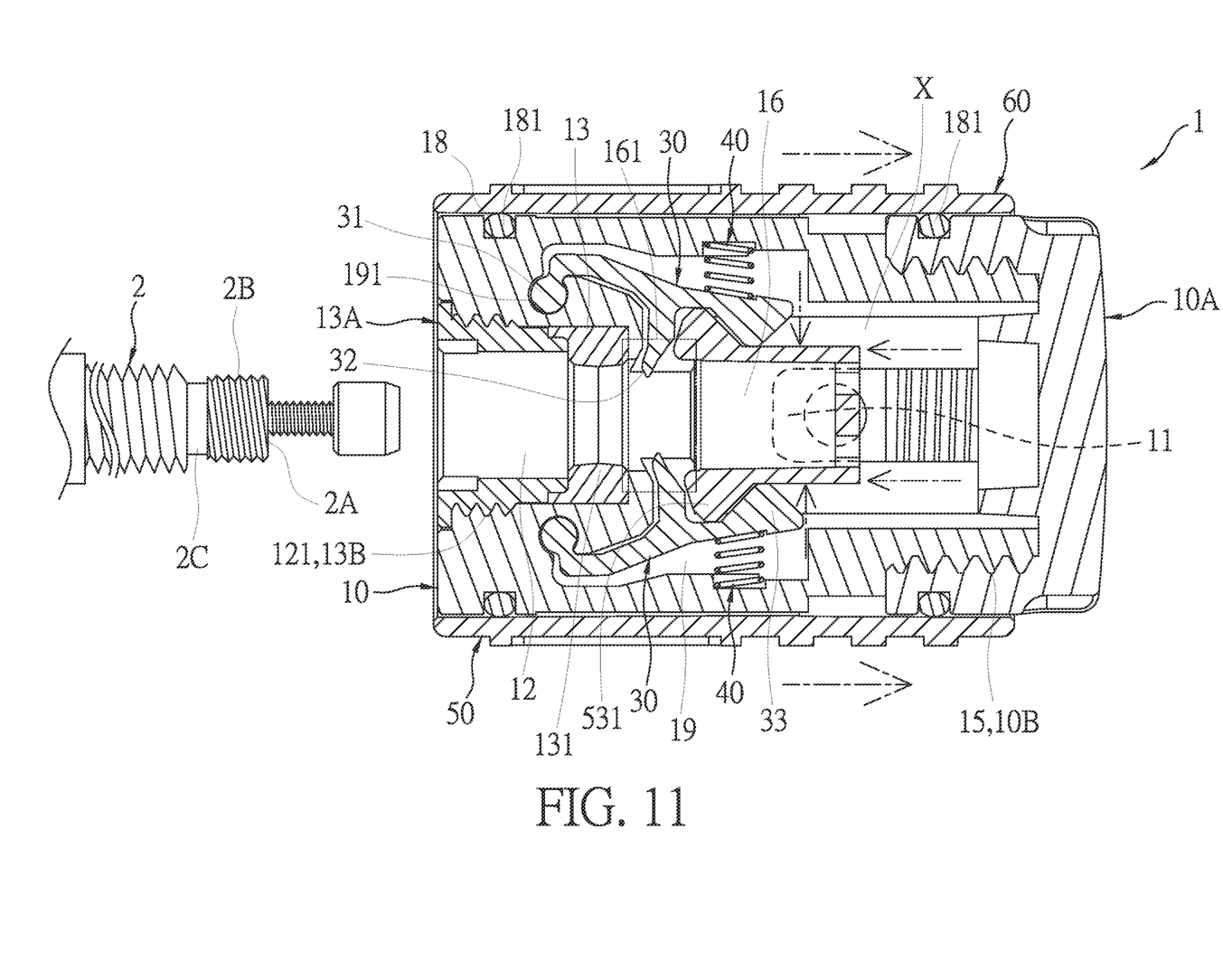
FIG. 11 is another cross sectional view showing the operation of the nozzle adapter for the Presta valve according to the preferred embodiment of the present invention.

After inflating the air, as shown in FIG. 10, the seal cover 50 is moved away from the Presta valve 2 with one hand, wherein the seal cover 50 slides on the connection seat 10, the two confining sections 531 of the seal cover 50 push the two controlled portions 33 of the two control elements 30 outward so that the two returning elements 40 are pressed, and the two engaging portions 32 of the two control elements 30 move away from the engagement position 161 outward to remove from the screwing portion 2B of the Presta valve 2, as illustrated in FIG. 11. Thereafter, the seal cover 50 drives the connection seat 10 to move away from the Presta valve 2 so that the nozzle adapter 1 removes from the Presta valve 2, the two returning elements 40 push the two control elements 30 back to an original position, and the two control elements 30 drive the seal cover 50 back to an original position for next using operation.

Thereby, the nozzle adapter for Presta valve has advantages as follows:

1. The nozzle adapter 1 for Presta valve 2 is operated with one hand easily and conveniently to connect with the Presta valve 2. After inflating the air, the nozzle adapter 1 is removed from the Presta valve 2 with one hand, and the Presta valve 2 is inserted into the outlet 12 of the nozzle adapter 1 automatically. The nozzle adapter 1 is removed from the Presta valve 2 by using the controlling means easily and conveniently.

2. The nozzle adapter 1 is applied to inflate the air at a high pressure. When an inflation pressure is excessive, the Presta valve 2 is pushed outward by the air pressure, and the two engaging portions 32 of the two control elements 30 are pulled to the screwing portion 2B of the Presta valve 2 so that the two engaging portions 32 engage with the screwing portion 2B of the Presta valve 2 more forcefully, thus using the Presta valve 2 to inflate the air at the high pressure appropriately.

While various embodiments in accordance with the present invention have been shown and described, it is clear to those skilled in the art that further embodiments may be made without departing from the scope of the present invention.

What is claimed is:

1. A nozzle adapter for an inflation valve comprising:
a connection seat including an imaginary axis line defined on a center of the connection seat, an inlet defined on a first end of the imaginary axis line, an outlet formed on a second end of the imaginary axis line, an air stop ring received in the outlet, a conduit defined between the inlet and the outlet, an engagement position defined in the conduit, a coupling defined as part of the connection seat, and a stopping means formed outside the coupling, the coupling having at least one controlling trench defined outside the conduit, wherein the at least one controlling trench extends to the engagement position via the inlet, and a respective controlling trench has a trench portion extending toward the outlet adjacent to the air stop ring;
at least one control element accommodated in the at least one controlling trench, wherein a respective control element has a fixing shaft extending on a first end thereof and connected with the trench portion, such that the at least one control element swings along the fixing shaft arcuately, the respective control element has an engaging portion extending from a second end thereof and has a controlled portion, wherein the engaging portion is toothed and extends out of the engagement position;
at least one returning element arranged on the at least one control element so that the engaging portion is pushed into the engagement position;
a seal cover positioned outside the coupling of the connection seat and having a cylindrical actuation portion positioned within the conduit, wherein when the seal cover is longitudinally moved the cylindrical actuation portion engages the at least one control element which moves the engaging portion in and out of the engagement position; and
an airtight space being defined in the coupling by mating the seal cover with the stopping means.

2. The nozzle adapter as claimed in claim 1 further comprising a cap, wherein the connection seat further includes a third threaded portion formed on the first end of the imaginary axis line, and the cap has a fourth threaded portion formed thereon, wherein the fourth threaded portion of the cap is screwed with the third threaded portion.

3. The nozzle adapter as claimed in claim 2, wherein the connection seat includes two grooves defined on the first end of the imaginary axis line, the seal cover further includes two slidable posts mounted on an inner wall thereof, and the cylindrical actuation portion is defined between the two slidable posts, wherein the cylindrical actuation portion has two confining sections driving the two controlled portions of two control elements, and the two slidable posts are slidably received and slide in the two grooves of the connection seat and are limited by the cap.

4. The nozzle adapter as claimed in claim 1 further comprising a lid covering the coupling of the connection seat and closing the at least one controlling trench.

5. The nozzle adapter as claimed in claim 1 further comprising a locking ring which has a first threaded portion formed on an outer wall of the locking ring, the connection seat has a second threaded portion formed on an inner wall of the outlet, such that the first threaded portion of the locking ring is screwed with the second threaded portion of the outlet so that the locking ring is fixed on the air stop ring.

6. The nozzle adapter as claimed in claim 1, wherein the air stop ring is made of rubber and has a protrusion formed on an inner wall thereof.

7. The nozzle adapter as claimed in claim 1, wherein the stopping means is two O-shaped rings, and the seal cover is fitted on an outer wall of the connection seat and mates with the two O-shaped rings, wherein the seal cover includes an inlet tube received in the airtight space and communicate with the inlet and the conduit.

8. The nozzle adapter as claimed in claim 1, wherein the engaging portion of the respective control element has a tilted guide face formed proximate to the outlet.

9. The nozzle adapter as claimed in claim 1, wherein the at least one returning element is a spring which is pressed.

* * * * *